United States Patent
Noble

(10) Patent No.: US 7,728,995 B2
(45) Date of Patent: Jun. 1, 2010

(54) SYSTEM AND METHOD FOR PROVIDING AN INDICATION OF THE PROXIMITY OF A MOVEABLE DEVICE

(75) Inventor: Gary Paul Noble, North Broadway (GB)

(73) Assignee: International Business Machines Corporation, Armonk, NY (US)

( * ) Notice: Subject to any disclaimer, the term of this patent is extended or adjusted under 35 U.S.C. 154(b) by 1644 days.

(21) Appl. No.: 10/951,837

(22) Filed: Sep. 28, 2004

(65) Prior Publication Data

US 2005/0075113 A1 Apr. 7, 2005

(30) Foreign Application Priority Data

Oct. 3, 2003 (GB) ................................. 0323133.9

(51) Int. Cl.
*G06F 15/00* (2006.01)
*G06K 1/00* (2006.01)

(52) U.S. Cl. ................. 358/1.15; 340/539.21; 340/994; 455/456.1; 455/456.5

(58) Field of Classification Search ................ 358/1.15, 358/1.16, 1.14, 1.8; 702/188; 235/385; 600/309; 455/457, 41.2, 552.1; 340/539.21, 994; 370/338

See application file for complete search history.

(56) References Cited

U.S. PATENT DOCUMENTS

| | | | | |
|---|---|---|---|---|
| 6,101,391 | A * | 8/2000 | Ishizuka et al. | 455/457 |
| 6,333,690 | B1 * | 12/2001 | Nelson et al. | 340/539.21 |
| 6,480,713 | B2 | 11/2002 | Jenkins | 455/412 |
| 6,669,089 | B2 * | 12/2003 | Cybulski et al. | 235/385 |
| 6,775,258 | B1 * | 8/2004 | van Valkenburg et al. | 370/338 |
| 6,804,532 | B1 * | 10/2004 | Moon et al. | 455/552.1 |
| 6,892,052 | B2 * | 5/2005 | Kotola et al. | 455/41.2 |
| 7,064,854 | B2 * | 6/2006 | Idehara | 358/1.15 |
| 7,106,468 | B2 * | 9/2006 | Jinbo et al. | 358/1.15 |
| 7,112,138 | B2 * | 9/2006 | Hedrick et al. | 463/29 |
| 7,151,453 | B2 * | 12/2006 | Ebert | 340/572.1 |
| 7,258,276 | B2 * | 8/2007 | Linton et al. | 235/385 |
| 2001/0051766 | A1 * | 12/2001 | Gazdzinski | 600/309 |
| 2002/0183979 | A1 * | 12/2002 | Wildman | 702/188 |
| 2006/0055564 | A1 * | 3/2006 | Olsen et al. | 340/994 |

FOREIGN PATENT DOCUMENTS

| | | |
|---|---|---|
| EP | 1 220 553 A1 | 7/2002 |
| GB | 2354386 A | 3/2001 |
| WO | WO 93/18476 | 9/1993 |
| WO | WO 00/36430 | 6/2000 |

* cited by examiner

*Primary Examiner*—Saeid Ebrahimi-Dehkordy
(74) *Attorney, Agent, or Firm*—Schmeiser, Olsen & Watts; William H. Steinberg

(57) ABSTRACT

A system and method are described for providing an indication of the proximity of a moveable device. The system comprises at least a first moveable device having a transmitting means for transmitting data comprising an identification of the first device and a second device having a receiving means for receiving data from the first device and a transmitting means for transmitting data including the identification of the first device together with an indication of the proximity of the identified device. A further device with a receiving means for receiving the data transmitted by the second device can be used in order to obtain an indication of the proximity of the first device. The indication of the proximity of the first device is a scale value which degrades as the first device moves away from the second device.

11 Claims, 3 Drawing Sheets

SYSTEM AND METHOD FOR PROVIDING AN INDICATION OF THE PROXIMITY OF A MOVEABLE DEVICE

FIELD OF THE INVENTION

This invention relates to the field of determining the location of a device. In particular, this invention relates to providing an indication of the proximity of a moveable device.

BACKGROUND OF THE INVENTION

People are becoming more mobile in their work and leisure pursuits. The development and popularization of the mobile phone has resulted in individuals moving about more freely. Arrangements to meet business colleagues can be made at short notice depending on the locations of the individuals when a contact is made by mobile phone. Similarly, in the social context, people meet without making predefined arrangements before setting out.

Therefore, individuals are more disconnected in that they are not as stationary in a set location but are more connected as they are reachable by mobile phone at other locations.

In this more mobile world, people may not be aware that other individuals are in the same proximity as them. Sometimes people meet by accident rather than planning but often without a specific arrangement, people simply miss each other.

Contacts both in business and socially are important to some people and they try to meet people they do not know for business or social purposes. People may try to be in the same location as a person they would like to meet in order to force a contact without formally approaching that person.

One of the aims of the present invention is to provide a mechanism for assisting in the building of social or business networks in highly dynamic environments where people may not be aware of the location of others. This is achieved by identifying when an entity has been in the proximity of a device in order to help to locate the location of the entity.

In addition to the application of the present invention to the movement and whereabouts of people for example, patients in a hospital, it can also be applied to the movement of objects. The objects may be any form of moveable object including, for example, vehicles, apparatus or equipment such as printers, computers, fire extinguishers, supermarket objects etc.

OBJECTS AND SUMMARY OF THE INVENTION

According to a first aspect of the present invention there is provided a system for providing an indication of the proximity of a device, comprising a first moveable device having a transmitting means for transmitting data including an identification of the first moveable device, and a second device having a receiving means for receiving data from the first moveable device and a transmitting means for transmitting data including the identification of the first moveable device with an indication of the proximity of the first device.

Preferably, the system includes a device having a receiving means for receiving the data transmitted by the second device in order to obtain an indication of the proximity of the first device.

The indication of the proximity of the first device may be the time since the first device moved out of a receiving range of the second device. Alternatively, the indication of the proximity of the first device may be a scale value which degrades once the first device moves out of a receiving range of the second device. The indication of the proximity of the first device may also decrease with each retransmission of the identification of the first device by a subsequent device.

The first and second devices may transmit one or more packets of data, each packet of data including an identification of a device and an indication of the proximity of the identified device. The first and second devices may transmit packets of data with each packet of data including additional information including one or more of a message, a qualifier, an identification of the transmitting device, the location of the transmitting device, and the number of times the data packet has been transmitted.

The data transmitted from the first device may include a value and a degradation formula of the value for providing an indication of the proximity of the first device. This value is transferred to the second device which degrades the value with retransmission of the data. The degradation formula may be a half-life degradation of the value.

The first device may be a radio frequency identification tag. Alternatively, the first device may include additional features including a receiving means for receiving transmissions of identifications of other devices. The first device may also retransmit identifications of other devices together with an indication of the proximity of the other devices. The first device may be an interactive device including a user interface in the forms of a mobile phone or PDA (personal digital assistant).

The second device may be at a fixed location. The second device may also have a connected device at a different location which includes transmission means and retransmits the data of the second device. This provides a bridging between different locations.

According to a second aspect of the present invention there is provided a method for providing an indication of the proximity of a device comprising the steps of providing a first moveable device and a second device and transmitting an identification of the first moveable device from the first moveable device to the second device, the second device receiving the transmission of the first moveable device and retransmitting data including the identification of the first moveable device together with an indication of the proximity of the first moveable device from the second device.

The method may include a device receiving the data retransmitted by the second device in order to obtain an indication of the proximity of the first device.

The indication of the proximity of the first device may be the time since the first device moved out of a receiving range of the second device. Alternatively, the indication of the proximity of the first device may be a scale value which degrades once the first device moves out of a receiving range of the second device. The indication of the proximity of the first device may also decrease with each retransmission of the identification of the first device by a subsequent device.

The first and second devices may transmit one or more packets of data, each packet of data including an identification of a device and an indication of the proximity of the identified device. The first and second devices may transmit packets of data, each packet of data including additional information including one or more of a message, a qualifier, an identification of the transmitting device, the location of the transmitting device, and the number of times the data packet has been transmitted.

The data transmitted from the first device may include a value and a degradation formula of the value for providing an indication of the proximity of the first device. The degradation formula may be a half-life degradation of the value.

The first device may receive and retransmit identifications of other devices together with an indication of the proximity of the other devices.

BRIEF DESCRIPTION OF THE DRAWINGS

Embodiments of the present invention will now be described, by way of examples only, with reference to the accompanying drawings in which.

DETAILED DESCRIPTION OF THE INVENTION

Figure 1:
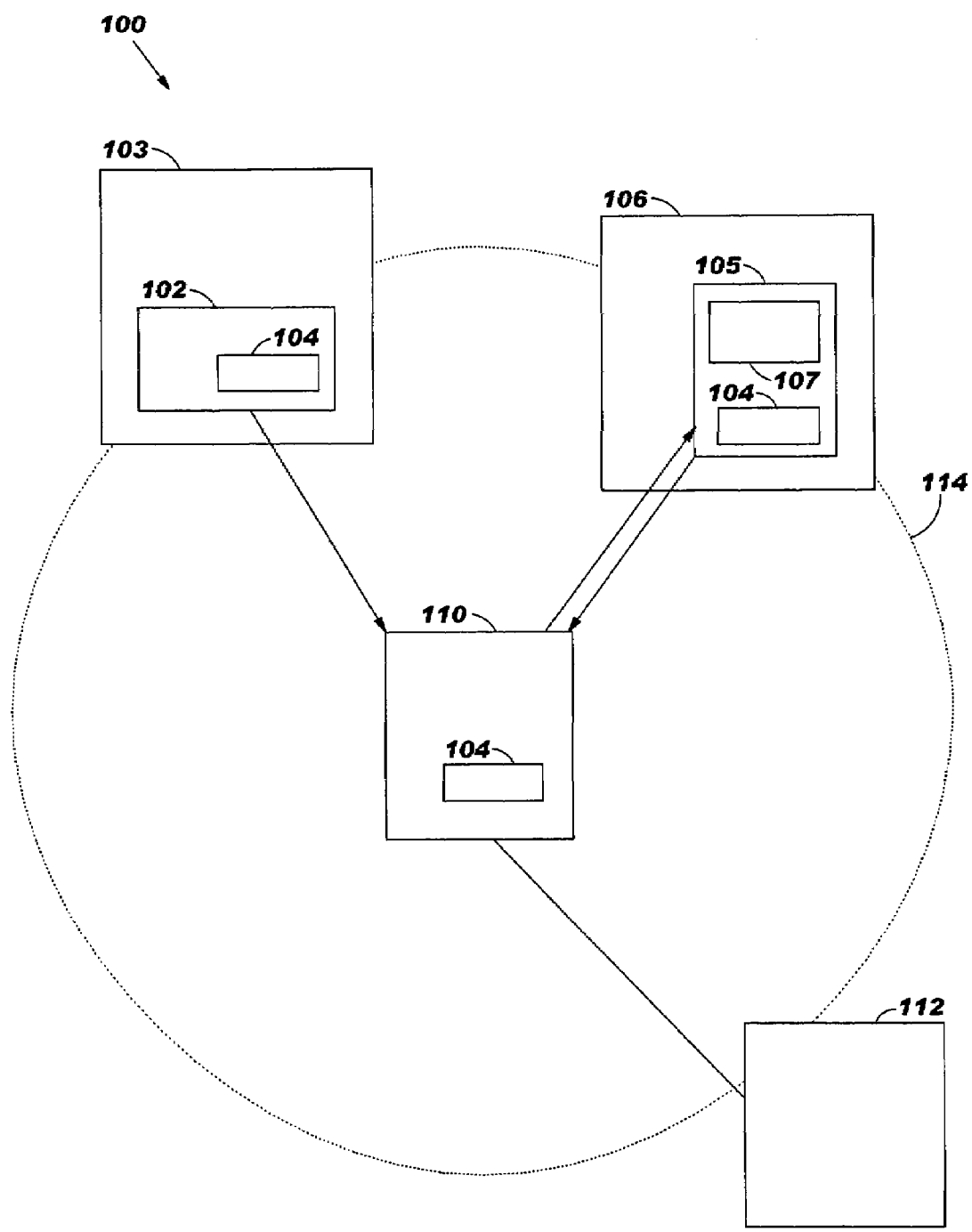
FIG. 1 is a schematic diagram of a system in accordance with the present invention.

There is provided a system for indicating the location and movement of mobile entities and in particular for indicating if an entity has been in the proximity of a device. The term mobile entity is used to include anything that can move either under its own volition or by some other means including people, animals, objects, vehicles, etc.

A device transmits an identifier and a value that provides an indication of the proximity of the identified device and hence the proximity of the mobile entity carrying the device. The value that provides an indication of the proximity may be provided in various different forms which are discussed further below. The value provides a strength of proximity indication similar to a hot or cold scale of nearness to an object as used in children's games. This enables a device to be tracked by moving around and taking directions which are increasing in value.

The system includes a plurality of moveable devices which are carried by mobile entities. The moveable devices may be passive tags, active tags or more interactive devices including a user interface. There are several different possible types of devices including different levels of functionality and the types of device can be combined in a number of different ways to provide systems with different applications but all falling within the scope of the invention.

A first type of device is a transmitting only device which is a moveable device that transmits a data packet identifying itself. Each data packet identifies the moveable device from which it has been transmitted and provides a value as an indication of proximity.

A second type of device is a receiving only device which receives data packets transmitted from other devices. This type of device can be used to track mobile entities without identifying itself.

A third type of device is a transmitting and receiving device which, as well as transmitting a data packet identifying itself, receives data packets transmitted from other devices.

A fourth type of device is a receiving and retransmitting device which receives data packets from other devices and retransmits the data packets. This fourth type of device is usually a stationary device. This type of device may, optionally, transmit its own identifying data packet.

A fifth type of device is a device which transmits its own data packet, receives other data packets, and retransmits other data packets. This multi-functional device can be left in one place at a stationary location or can be carried around.

The devices can be sole purpose devices specifically for the purpose of locating, or the functionality of the devices can be added to an existing device such as a mobile phone or a PDA (Personal Digital Assistant) which is carried on a person.

The data packet transmitted by a device includes an identifier of the device and a value as an indication of the proximity of the device. The identifier or key identifies the moveable device and hence the mobile entity by which the moveable device is carried or in which it is embedded. The value is a scale value which provides an indication of the proximity of the mobile entity.

If necessary, an indication of the mathematical degradation of the value may also be given in the data packet. The system may use the same form of degradation for all devices in which case an indication of the form of degradation is not needed. However, if devices use different degradations (for example, different half lives) the form of degradation needs to be identified in the data packet. The data packet may also include additional information, for example, a qualifier, a message, etc.

In general, a value will be at 100% when transmitted with an identifier which identifies that device. If a device transmits an identifier of another device the value may be decreased to indicate that the transmitting device is not the identified device. The value may decrease at each hop between transmitting devices. However, in some situations, if the identified device is in the close proximity to a device which is retransmitting the identifier with a value, the value may be kept at full strength. As the identified device moves away from the retransmitting device the value will decrease, over time or distance.

In one embodiment, the value may be added to the identifier at the point of retransmission by another device. Therefore, if there is no value, the device is transmitting its own identification. If there is a value, the identification has been retransmitted and the value may decrease as before with transfers between devices or with time or distance.

The decrease in value may be a linear decrease over time, or a decrease in accordance with some other mathematical degradation formula, for example, a half-life degradation. Where the value has a half-life of a set period of time, the value halves over each period of time. For example, if the value is 100 and the half-life is 30 minutes, after 30 minutes the value will be 50, after 1 hour the value will be 25 and after 2 hours the value will be 6.25. A cut off value, for example, a value of 1, results in the expiry of the data packet.

Furthermore, a decrease in value may occur every time a data packet is retransmitted by another device. A data packet may be retransmitted by one device and received and retransmitted by a further device, each hop from one device to another may incur a reduction in the value to indicate that the data packet is becoming further removed from the original identified device.

The value may expire after a certain time or when it reaches a certain value. The expiry takes place when the identified device is sufficiently removed from the retransmitting device for the trail to be cold.

A retransmitted data packet may also contain an identifier of the location of the retransmitting device, if it is stationary, an identifier of the retransmitting device, and/or information relating to the number of hops or transfers of the transmitted data packet.

Referring to FIG. 1, further details of the system are described. FIG. 1 shows a system 100 with three devices. The first device is a moveable device which is a tag 102 in the form of a Radio Frequency Identification tag which is embedded in an object 103. This first device is transmitting only device.

The second device is an interactive device 105 which is carried by a person 106 or embedded in an object. The third device is a stationary device 110. As will become apparent from the description of the proposed system, a wide range of embodiments are possible with devices having a range of possible features and FIG. 1 shows a sample of three possible devices.

The first device shown in FIG. 1 is a Radio Frequency Identification (RFID) tag 102. RFID is a known system in which tags are embedded in objects and are used to automatically identify the object. Details of RFID systems are given at www.aimglobal.org/technologies/rfid. In brief, a basic RFID system has a transponder which is the tag which has an integrated circuit which is electronically programmed with unique identifying information and also includes an antenna for transmitting data when the tag is interrogated. An antenna or coil emits radio signals to activate the tag and read and when the tag is an active tag, write data to it.

An antenna can be packaged with a transceiver and decoder to become a reader which emits radio waves in a given range from a few centimeters to 30 meters or more depending on the power output and the radio frequency. When an RFID tag passes through the electromagnetic zone of the reader, it detects the activation signal of the reader. The reader decodes the data encoded in the tag's integrated circuit and the data is passed to a processing unit.

Active RFID tags are powered by an internal battery and are typically read/write devices which means that the tag data can be modified or rewritten. An active tag's memory size varies with up to approximately 1MB of memory. An active tag can record operational data transmitted to it as well as transmitting its identification data.

Passive RFID tags are much lighter and low cost tags which obtain operating power from a reader. They are programmed with read-only data that cannot be modified (usually 32 to 128 bits). Passive tags have shorter reading ranges and are generally used as simple identification tags.

In the described system, an RFID tag 102 is provided which may be passive or active. The tag 102 has an integrated circuit which stores a data packet 104.

The tag 102 transmits the data packet 104 either continually or when it is within range of a receiving device.

In FIG. 1, a receiving device in the form of a stationary device 110 is shown. The stationary device 110 is a form of antenna which receives data packets 104 from moveable devices 102, 105 and retransmits the data packets 104. Whilst the moveable device 102, 105 is in the receiving range of the stationary device 110, the stationary device 110 retransmits the data packet 104 of the moveable device 102, 105 without a degradation of the value in the data packet 104. Once the moveable device moves out of the receiving range of the stationary device 110, the value is degraded to indicate the decreasing proximity of the moveable device to the stationary location 110. The stationary device 110 also states its position or description with the retransmission of the data packet 104.

A stationary device 110 has a transmitting and receiving means, a clock, data storage means, a central processing unit and a power source. The stationary device 110 may also have communication means to communicate data from the stationary device 110 to an external data processing unit 112. The external data processing unit 112 may keep data relating to the location of moveable devices as received from a plurality of stationary devices 110 in order to build a picture of location information.

The stationary device 110 may also have programmable logic, for example, including a rule engine for triggering an event such as activating an alarm for security or safety purposes in response to a received data packet.

A stationary device 110 has a range 114 in which it can receive data packets from moveable devices 102, 105 and in which the retransmission of the data packets extends. The range 114 will depend on the frequency of radio transmission being used by the system 100 and the power of the stationary device 110.

The second type of moveable device is an interactive device 105 which is carried by a person who is a user 106 of the device 105. The user 106 can interact with the device by means of a user interface 107 provided on the interactive device 105. This interaction may be simply to read information from the user interface 107 or may be more sophisticated with input from the user 106.

The interactive device 105 has a transmitting means for transmitting a data packet 104. The interactive device 105 may also have a receiving means for receiving data from stationary devices 110 and other moveable devices 102. This aspect of an interactive device 105 will be described further below.

The interactive device 105 also has a clock, data storage means, a central processing unit and a power source. The interactive device 105 may be a mobile phone or PDA with the functionality of the interactive device 105 incorporated into it.

As with the moveable device in the form of the tag 102, the interactive device 105 transmits a data packet 104 of the same form as transmitted by the tag 102 which includes a key, a value and a mathematical degradation of the value. As with the tag 102, the data packet 104 may also include additional information, for example, a qualifier, a message, etc. The user interface 107 allows the user 106 to input or amend information in the data packet 104 at any time. The interactive device 105 transmits the data packet 104 either continually or when it is within range of a receiving device.

The interactive device 105 includes a receiving means for receiving data packets 104 which have been transmitted or retransmitted by a device 102, 110. Retransmitted data packets 104 include the degrading value which provides information to the user 106 as to how long ago the moveable device identified in the data packet 104 was within the receiving range 114 of the retransmitting device 110.

In this example, an interactive moveable device 105 has a transmitting means and a receiving means. A device may only have a receiving means for picking up data packets without transmitting its own identification data packet.

A receiving means can calculate from the value and the details of the degradation, the time since a moveable device was in the vicinity of the receiving device, or an indication of proximity in the form of a scale value.

The interactive device 105 can have a contacts list providing details of identifications which the user 106 of the interactive device 105 is interested in. The user interface 107 can then automatically display any data packets 104 with corresponding locations and times since at the location for other moveable devices of interest to the user 106 of the interactive device 105.

A transmitting device 102, 105 can transmit more than one data packet 104 containing different identification data and values. This may be of use if a moveable device 102, 105 wishes to leave a different value or additional information for a particular user or group of users who may receive the retransmitted data packet 104.

In one embodiment, a moveable device in the form of an interactive device may also receive data packets from another moveable device and retransmit the data packet or packets of the other moveable device as well as its own one or more data packets.

If a first moveable device comes within the receiving range of a second moveable device which is an interactive device, the second moveable device can receive all the data packets of the first moveable device and retransmit the data packets as well as the second moveable device's own data packet or packets. If the second moveable device has other device's data packets, these are also passed on as well as remaining with the second device.

If a second moveable device retransmits the data packet of a first moveable device, the value starts to degrade once the first moveable device moves out of the range of the second moveable device. There may also be a weighting to the value to compensate for the fact that the second moveable device is transmitting the data packet. For example, the value may be halved or multiplied by a reducing factor. When the value reaches a predetermined threshold, or after a predetermined time, the retransmission will cease.

The value contained in a data packet provides an indication of a strength of proximity of the moveable device identified in the data packet. This indication is transmitted from various locations and, in some cases, from other moveable devices. Therefore, a user with a receiving means can identify how long ago a moveable device was in a location. By moving from location to location and receiving the data packets with the value at different locations, a user can ascertain if he is moving closer to the moveable device of interest to him which would be indicated by an increase in the value, or if he is moving further away which would be indicated by a decrease in the value.

In the embodiment in which a second moveable device can retransmit the data packet of a first moveable device, the user can ascertain if the first moveable device in which he is interested has been in the proximity of the second moveable device.

In a further embodiment of the described system, a location station may have a sister station in another location so that the sister station transmits the same data packets as the location station. In this way, a receiving moveable device passing the sister station will receive data packets indicating moveable devices who have recently been in the proximity of the location station. This provides a bridge between locations.

For example, in a business environment in which there are more than one geographic sites of the business, each site can have a sister station at the other sites so that people can beware of the presence of other people or mobile entities at the other site. The distance between the sites has been bridged.

A location station and its one or more sister stations must have a data link to enable communication between the locations. The data link may be a network connection, such as a LAN or WAN, or may be a non-permanent connection such as an e-mail or messaging connection.

In a further embodiment, a stationary device may be time based in that it does not receive or retransmit data packets at certain times, for example, at night. This could be applied in a security system in which a stationary device is provided at a security door. A moveable device transmitting a data packet can be identified by the stationary device at the door and the door can be opened automatically as well as the stationary device recording the presence of the passing moveable device. However, at night, the door will not be activated and cannot be opened.

Figure 2A:
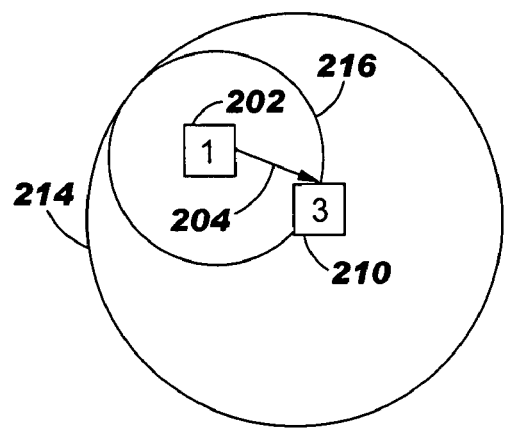
FIGS. 2A, 2B and 2C are a sequence of diagrams showing a use of the system of FIG. 1.
Figure 2B:
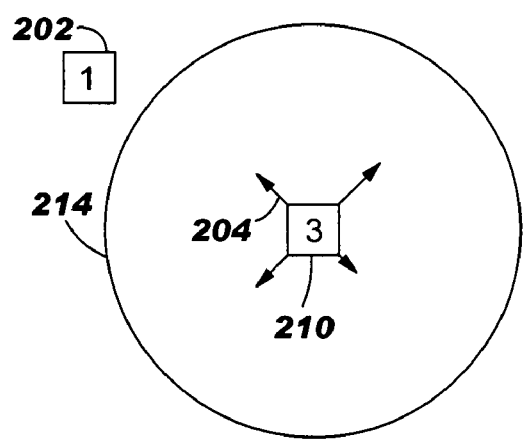
Figure 2C:
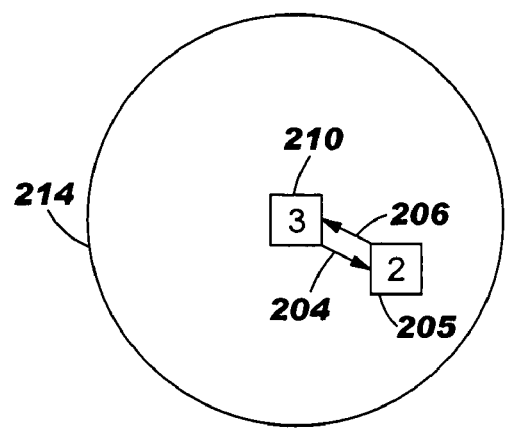

FIGS. 2A, 2B and 2C show a sequence of events illustrating the operation of the described system. In FIG. 2A a first moveable device 202 transmits a data packet 204 containing a key identifying the first moveable device 202, a value which in this case is 100 and an indication of the form of degradation which in this case a half-life of 30 minutes. The first moveable device 202 has a transmitting range 216.

The first moveable device 202 passes within a receiving range 214 of a stationary device 210. The stationary device 210 receives the data packet 204. The stationary device 210 retransmits the data packet 204 of the first device 202 with the value at 100% as the first device 202 is in the close proximity of the stationary device 210. The value may be reduced by a factor to reflect the retransmission of the data packet 204 by another device. The stationary device 210 has a greater transmitting range 214 than the first moveable device 202 and therefore, being in the close proximity of the stationary device 210 results in the data packet 204 of the first moveable device 202 being transmitted further.

In FIG. 2B, the first moveable device 202 moves out of the receiving range 214 of the stationary device 210. Once the stationary device 210 no longer receives the data packet 204 from the first moveable device 202, the stationary device 210 starts to degrade the value in the retransmitted data packet 204. In the retransmitted data packet 204 the value degrades in accordance with the form of degradation which may be specified in the data packet 204.

FIG. 2C shows a second moveable device 205 which moves within the range 214 of the stationary device 210. The second moveable device 205 is also transmitting a data packet 206 identifying the second moveable device 205. The stationary device 210 receives the data packet 206 of the second moveable device 205 and again starts to retransmit the data packet 206 of the second moveable device 205.

Meanwhile, the second moveable device 205 includes a receiving means which receives the retransmitted data packet 204 of the first moveable device 202, which has since moved away, from the stationary device 210. The second moveable device 205 receives the retransmitted data packet 204 from the stationary device 210 and obtains the information that the first moveable device 202 was in the range 214 of the stationary device 210 a certain time ago.

The time can be determined by the value which has degraded since the first moveable device moved out of range of the stationary device 210.

Examples of the use of the described system will now be provided to illustrate the wide-ranging application of the system.

EXAMPLE 1

Figure 3:
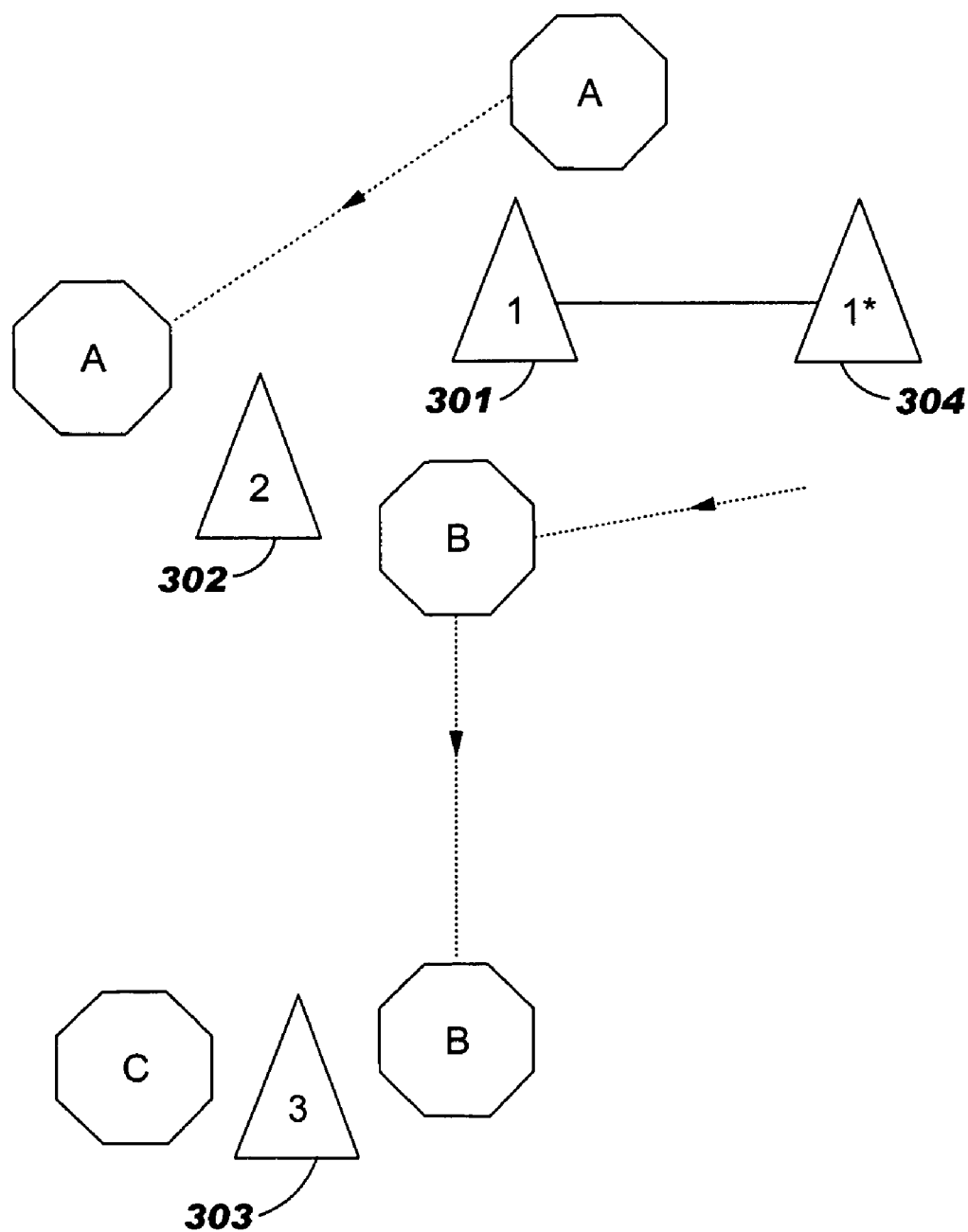
FIG. 3 is a schematic diagram of an application of the system as described in Example 1 in accordance with the present invention.

Referring to FIG. 3, an example is described in which people in an office situation are the mobile entities and each carries an interactive moveable device which may be incorporated into their mobile phones, a PDA or may be a separate device.

A first person A arrives at an office at the entrance 301. The entrance 301 is location station 1 with a stationary device for receiving and retransmitting data packets. Person A is a subcontractor who does not work at the office every day. Person A has a moveable device which transmits a data packet including the following data:

personA@company.com—the identification of person A;
    on project X—an optional qualifier to provide additional information;
    value 100, half-life 10 minutes—the degradation format of the value.

The stationary device at location station 1 retransmits the data packet of person A with the degrading value once person A has moved out of range of location station 1. Anyone passing the entrance 301 can receive the data packet of person A and be informed that person A entered the office a given time ago and is in the office in order to work on project X.

Person A goes to the office library 302 which is location station 2 and sits and reads some papers in preparation for a meeting.

Person B, who is a permanent employee of the company and has his place of work at the office, passes the office library 302 and in so doing the data packet of person B is transmitted from a moveable device carried by person B and received by the station location 2. Once person B has passed, the data packet is retransmitted with its degrading value. The data packet of person B includes the following data:

personB@company.com;
permanent employee;
value 10, half-life 10 minutes.

The moveable device of person B also receives the data packet of person A and, once person B has moved out of range of person A, the moveable device of person B retransmits the data packet of person A as well as that of person B. The retransmitted data packet of person A has a weighted value to compensate for the fact that the data packet is being transmitted by another person. For example, the value of person A is weighted by halving the value from 100 to 50. The degradation of the value also starts once person B is out of range of person A.

Person B continues to walk around the office and passes the door 303 of the workplace of person C. Person C has a moveable device which receives the data packets of passing moveable devices. Person C is not interested in person B; however, he is interested in person A and has a contacts list programmed into the receiving means of his moveable device. As person B passes the door 303, his moveable device transmits the data packet of person A which is received by the moveable device of person C and as a contact of interest, the moveable device alerts person C to the data packet it has received. Person C then has the information that person A is on the premises and that the passing person B was in the vicinity of person A a given time ago. If person B took 10 minutes to walk from the office library 302 to the door 303 of person C, the value for person A will have decreased to 25.

Person C can then either phone person A or walk around the office to find person A. Location stations positioned around the office will indicate to person C if he is moving towards person A or further away.

If a value is high and a half-life is low, people can follow others around a building if they move quickly. The value and half-life, of other degradation formula, can be set according to the amount a person moves around, how often they are in a location, etc.

In addition, the location station 1 at the entrance 301 of the office can be bridged to a remote site 304, for example, another geographical site of the business. A sister location station 1* at the remote location can also transmit the same data packets as location station 1 providing details to people passing the sister location station 1* of the people who have entered the office at entrance 301.

In addition, the stationary device at location station 1 could transfer all information regarding data packets received to an external data processing unit which collects data on movement of all moveable devices as a central record.

EXAMPLE 2

In Example 1, the mobile entities were all people carrying moveable devices. In this example, the mobile entities are pieces of equipment, for example, in a hospital or other organization environment. Pieces of equipment may be moveable, for example, hospital apparatus such as monitors, apparatus, etc. or office equipment such as printers, computers, etc. Trying to locate equipment which has been moved by other personnel can be time consuming and wasteful of resources.

Each piece of equipment can have a moveable device in the form of a transmitting tag which transmits a data packet including a value and degradation formula. Stationary devices for receiving and retransmitting the data packets are positioned around the organization premises. A person can carry a receiving means, which can be incorporated into a moveable device with a transmitting means for identifying the person, or alternatively, may be only a receiving device. The receiving means can receive the retransmitted data packets from the location stations enabling the user to track a piece of equipment.

Further examples include the following:

A stationary device may be enhanced to provide messages or actions to a certain type of data packet. A person may have a data packet for a meeting and as the person walks past a stationary device, the stationary device may provide an audio or visual message relating to the meeting, say a change of venue or time.

Trains transmitting data packets at stations on a track to enable other trains to pick up the data packets and calculate how long ago the previous train passed. If the data packet also includes the train's speed, the distance between trains can be calculated.

A message can be sent via communication means to interactive devices to obtain information as to whether any devices have received a data packet of a particular identity. A device may respond with a location that identity was at a certain time ago.

The system could even be used by a person to retrace their steps. For example, a person can use the system to backtrack to find a car in a car park.

Improvements and modifications can be made to the foregoing without departing from the scope of the present invention.

What is claimed is:

1. A method for providing an indication of the proximity of a device comprising the steps of:

providing a first moveable device, a second device, and a third moveable device;

transmitting an identification of the first moveable device from the first moveable device to the second device, the second device receiving the transmission of the first moveable device and retransmitting data including the identification of the first moveable device together with an indication of the proximity of the first moveable device from the second device;

said third moveable device receiving the data retransmitted by the second device in order to obtain an indication of the proximity of the first moveable device;

moving the first moveable device out of a receiving range of the second device; and measuring an amount of time elapsed since the first moveable device has moved out of the receiving range of the second device.

2. The method of claim 1, wherein the amount of time elapsed is denoted as a scale value which decreases once the first moveable device moves out of the receiving range of the second device, and wherein the method further comprises the step of retransmitting the identification of the first moveable device by the third device such that the scale value is decreased via said retransmitting by the third device.

3. A method for providing an indication of the proximity of a device comprising the steps of:
- providing a first moveable device and a second device;
- transmitting an identification of the first moveable device from the first moveable device to the second device, the second device receiving the transmission of the first moveable device and retransmitting data including the identification of the first moveable device together with an indication of the proximity of the first moveable device from the second device;
- providing a third device and receiving the data retransmitted by the second device in order to obtain an indication of the proximity of the first moveable device; and
- transmitting one or more packets of data from the first moveable device and the second device, each packet of data including an identification of another device and an indication of the proximity of the another device, wherein each packet of data of the one or more packets of data includes a total number of times said each packet of data has been transmitted.

4. A method for providing an indication of a proximity of a device, said method comprising:
- receiving first data by a second device from a first moveable device that is within a receiving range of the second device, wherein the receiving range is a spatial distance from the second device over which the second device is configured to receive data from devices, wherein the first data comprises an identification of a moveable device of interest, a first value whose magnitude is a function of a proximity of the moveable device of interest from the second device, and a degradation formula specifying how the first value decreases as a function of a time duration over which the first moveable device is outside the receiving range after having been within the receiving range, and wherein the first value does not exceed a specified 100% value; and
- transmitting second data from the second device to a third device that differs from the first moveable device and the second device, wherein the second data comprises the identification of the moveable device of interest, a second value that is a function of the first value and does not exceed the first value, and the degradation formula.

5. The method of claim 4, wherein the degradation formula specifies that the magnitude of the first value is a linearly decreasing function of the time duration.

6. The method of claim 4, wherein the degradation formula specifies that the magnitude of the first value decreases in accordance with an indicated half life such that the first value is halved at each elapse of the half life.

7. The method of claim 4, wherein first value is less than the 100% value.

8. The method of claim 7, wherein first value reflects a first reduction from the 100% value due to the first moveable device differing from the moveable device of interest.

9. The method of claim 8, wherein first value reflects a second reduction from the 100% value due to the first moveable device being N hops removed from the moveable device of interest, wherein N is at least 2, and wherein the second reduction is an increasing function N.

10. The method of claim 4, wherein the second value is equal to the first value.

11. The method of claim 10, wherein the method further comprises: after said transmitting second data, ascertaining by the second device that the first moveable device has moved outside the receiving range; and
- after an amount of time has elapsed since said ascertaining, computing a third value that is less than the first value in accordance with the degradation formula;
- after said computing, transmitting third data from the second device to a fourth device that differs from the first moveable device, the second device, and the third device, wherein the third data comprises the identification of the moveable device of interest, the third value, and the degradation formula.

* * * * *